Figure 1:

Jan. 16, 1951          J. M. HILEMAN          2,538,244

HEAT-TREATMENT OF COILS OF ALUMINUM FOIL

Filed March 3, 1950

INVENTOR
James M. Hileman
BY
Howard B. Funk
ATTORNEY

Patented Jan. 16, 1951

2,538,244

UNITED STATES PATENT OFFICE 2,538,244

HEAT-TREATMENT OF COILS OF ALUMINUM FOIL

James M. Hileman, New Kensington, Pa., assignor to Aluminum Company of America, Pittsburgh, Pa., a corporation of Pennsylvania Application March 3, 1950, Serial No. 147,551

3 Claims. (Cl. 148—13)

This invention relates to improvements in the thermal treatment of coils of aluminum foil in the as-rolled condition, particularly foils having a thickness of .0007 inch and less, in preparation for printing, coloring, lacquering, bonding and other decorating or converting operations requiring dry surface, annealed foil. Such foil is commonly referred to as converter foil. The object of the invention is to minimize or overcome much of the sticking of the foil presently encountered in unwinding after thermal treatment and to avoid the injurious effects of sticking on the quality of the foil.

At present, the coils of converter foil in the as-rolled condition are prepared for such converter operations by thermal treatment or annealing to soften the foil and to drive off the rolling lubricant. For the annealing operation, the rolls or spools of foil are usually center supported horizontally in spaced relation to each other on a suitable carrier and charged into a suitable furnace. Therein, the metal is heated to the desired temperature, usually between 600° to 700° F. and soaked at that temperature for a desired interval. Thereafter, the coils are removed from the furnace and permitted to cool to room temperature. As is well known, this necessary annealing of the coils impairs the free unwinding characteristic which the coils had prior to annealing so that after annealing much difficulty is experienced with sticking within a coil when the foil is being unwound and run through a printing or other converter operation. Many of the foil wraps or convolutions will be found to be stuck to each other by sticky residue from the rolling lubricant in varying degrees of severity, particularly along marginal areas in irregular patterns, but mostly toward the outer side or periphery of the coil. As some wraps are reached as unwinding progresses, the sticking is tenacious enough to exceed the tensile strength of the thin foil and rupture occurs. Sometimes several foil breaks will occur during unwinding of the coil. Accompanying such breaks is the injurious stretching and consequent wrinkling of the foil in adjacent areas and in underlying wraps to such extent as to destroy the flatness of the foil strip. Even at points where the sticking does not result in a foil break, the pull necessary to overcome the adhesion causes this injurious stretching and wrinkling. In high quality printing and other conversion operations, such wrinkled foil is detrimental and very objectionable and the cause of much scrap loss and, manifestly, it is very desirable to avoid foil breaks and their attendant losses.

It is the purpose of this invention to minimize this sticking condition within the annealed coils and that end, I have discovered, is accomplished effectively by wrapping the coils individually with heat insulating blankets before annealing so as substantially to equalize the radial flow of heat into and out of the coils at their outer and inner peripheral surfaces or sides and in wrapping in such manner as to cause the greatest rate of heat flow to take place in an axial direction through the end surfaces of the coils.

Figure 3:
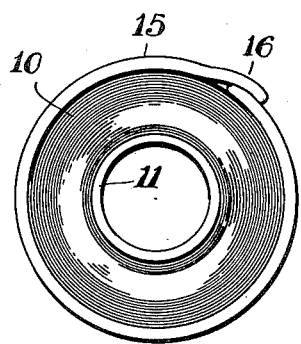
Figure 2:
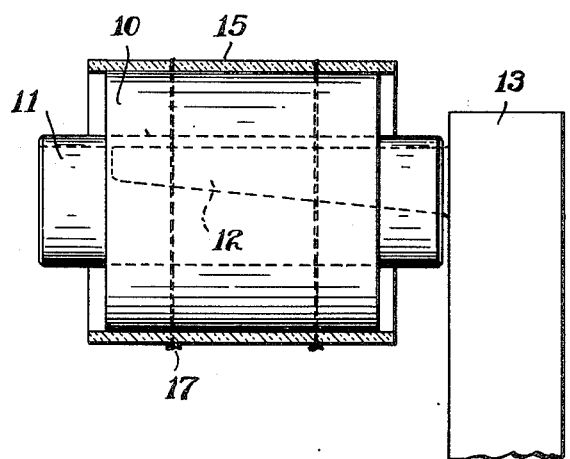

For illustrative purpose, reference is made to the accompanying drawing in which Fig. 1 shows, diagrammatically in cross-section, the make-up of a suitable blanket used in practicing the invention, Fig. 2 shows, in side elevation and partly in section, a blanketed coil in readiness for annealing, and Fig. 3 is an end view thereof.

Referring to Figs. 2 and 3, 10 represents the coil of foil and 11 the hollow metal spool or core on which the foil strip coming from the rolling mill rolls is wound under winding tension in usual manner, the spool 11 projecting beyond the ends of the foil coil so that the composite coil may be handled in customary fashion without damaging the foil. 12 represents a horizontal arm of a conventional multi-armed carrier 13 on which the coil is supported for annealing. Additional coils, of course, are positioned on other arms of the carrier to make up a furnace load, the coils being arranged in horizontal and vertical rows and spaced from each other for free circulation thereabout of the furnace atmosphere.

According to this invention, each coil is wrapped with a flexible, heat insulating blanket 15 which is wound circumferentially around the coil at least one full wrap and its ends overlapped as indicated at 16, so as completely to enclose the outer peripheral surface or exterior side of the foil coil. The width of the blanket is preferably a little greater than the width of the foil so as to extend slightly beyond both edges of the foil. The ends of the coil are uncovered. Suitably, the blanket may be held in place by means of encircling tie wires 17 whose ends are twisted together, or by any other suitable means. Blankets of various make-ups may be employed so long as those employed for wrapping the coils of a given batch or load to be annealed afford substantially the same heat controlling effect on each coil. The make-up shown in Fig. 1, which has been found quite satisfactory, consists of a layer of rockwool 20 disposed between two sheets of aluminum foil 21, of a thickness of .001 inch or heavier, and exterior layers 22 of woven asbestos cloth, all suitably stitched together into a unitary blanket that is effective and reusable many times.

The blanketed coils are annealed with the blankets thereon forming open-ended shielding cylinders entirely enclosing and retarding the radial heat flow into the coils along their exterior side to substantially the same extent that the spools 11 prevent the rapid radial influx of heat at the inner side of the coils. Thereby, the heat flow in a direction normal to the axis of each coil is substantially equalized. Principally, the heat flow is in an axial direction through the end surfaces of the coils due to the unblanketed or exposed condition thereof. Thus, greater effectiveness in the heat action on the respective convolutions of each coil in volatilizing and driving off the rolling lubricant is induced. Also when the load of coils is removed from the furnace, the blankets serve to prevent rapid dissipation of heat from the outer periphery of the coils, here again the heat flowing mostly from the ends of the coils and thus extending the cooling period. The result of the substantially progressive endwise heating and cooling of the coils which occurs is to promote the escape of oil vapor from between adjacent convolutions of each coil, so that less sticky lubricant residue remains to cause sticking to the troublesome extent heretofore experienced. In any event, annealing of the coils surrounded by blankets has been successfully used, in the embodiment illustrated and described, to so minimize the sticking condition within the coils that the liability of foil breaks due to sticking during subsequent unwinding is practically eliminated and the foil when unwound is of improved quality in respect to brightness and flatness, so that it is especially adapted to high speed converting operations.

The use of multi-layer blankets for wrapping the coils prior to heat treatment, as described, is preferred in practicing the invention because of their advantages in application to the coils, only one wrap being required, and in handling and in storing them. It will be apparent, however, that a single strip of suitable insulating material, such as glass or mineral wool, or asbestos, adapted for wrapping several times around a coil may be used, or a plurality of sheets of such material, each adapted to encircle a coil may be applied to build up a shielding cylinder equivalent to the unitary blanket.

Having thus described my invention, I claim:

1. The method of minimizing sticking between adjacent wraps of coils of aluminum converter foil which are subjected to heat treatment in the as-rolled condition to anneal the foil and drive off the rolling lubricant, which comprises blanketing each coil to retard the radial flow of heat through the entire outer periphery thereof during annealing thereby causing a greater rate of heat flow axially through the ends of the coil.

2. In a method of thermally treating as-rolled aluminum converter foil coiled on a center spool wherein a plurality of said coils are center supported horizontally in spaced relation to each other and subjected to a heating and a cooling cycle, the improvement consisting in placing heat flow retarding material around the outer periphery of each coil to substantially equalize the heat flow into the coils at their outer and inner peripheries in a direction normal to the coil axis, and maintaining a substantially greater rate of heat flow through the ends of the coils during the heating and cooling of said coils.

3. The improvement in the thermal treatment of coils of aluminum converter foil in the as-rolled condition in preparation for a printing or other converter operation, which consists in wrapping each coil with a heat insulating blanket extending entirely around the outer side of the coil and forming an open-ended shielding cylinder, and subjecting the wrapped coils to a heat treatment including a heating and a cooling cycle.

JAMES M. HILEMAN.

No references cited.